United States Patent [19]

Friese et al.

[11] Patent Number: 5,406,246
[45] Date of Patent: Apr. 11, 1995

[54] TEMPERATURE SENSOR AND METHOD FOR PRODUCING TEMPERATURE SENSOR ELEMENTS

[75] Inventors: Karl-Hermann Friese, Leonberg; Harald Neumann, Vaihingen/Enzweihingen, both of Germany

[73] Assignee: Robert Bosch GmbH, Stuttgart, Germany

[21] Appl. No.: 971,778

[22] PCT Filed: Jul. 25, 1991

[86] PCT No.: PCT/DE91/00601

§ 371 Date: Feb. 12, 1993

§ 102(e) Date: Feb. 12, 1993

[87] PCT Pub. No.: WO92/03711

PCT Pub. Date: Mar. 5, 1992

[30] Foreign Application Priority Data

Aug. 14, 1990 [DE] Germany ............... 40 25 715.0

[51] Int. Cl.⁶ .................... H01C 7/10; H01C 1/012
[52] U.S. Cl. ................... 338/22 R; 338/25; 338/307; 338/314; 29/612
[58] Field of Search ........... 338/22 R, 225 D, 25, 338/307, 308, 314, 334; 29/612

[56] References Cited

U.S. PATENT DOCUMENTS

| | | | |
|---|---|---|---|
| 4,345,465 | 8/1982 | Gruner | 73/204 |
| 4,418,329 | 11/1983 | Gruner | 338/28 |
| 4,464,646 | 8/1984 | Burger et al. | 338/25 |
| 4,502,939 | 3/1985 | Holfelder et al. | 204/429 |
| 4,645,552 | 2/1987 | Vitriol et al. | 156/89 |
| 4,818,363 | 4/1989 | Bayha et al. | 204/426 |
| 4,839,018 | 6/1989 | Yamada et al. | 204/425 |
| 4,901,051 | 2/1990 | Murata et al. | 338/25 |
| 5,142,266 | 8/1992 | Friese et al. | 338/22 |
| 5,172,466 | 12/1992 | Friese et al. | 29/612 |
| 5,181,007 | 1/1993 | Friese et al. | 338/22 R |

FOREIGN PATENT DOCUMENTS

| | | |
|---|---|---|
| 0098067 | 1/1984 | European Pat. Off. . |
| 0142993 | 5/1985 | European Pat. Off. . |
| 0188900 | 7/1986 | European Pat. Off. . |
| 0201583 | 11/1986 | European Pat. Off. . |
| 2302615 | 8/1974 | Germany . |
| 7931134 | 2/1980 | Germany . |
| 250576 | 11/1983 | Germany . |
| 3445420 | 6/1985 | Germany . |
| 3829764 | 3/1989 | Germany . |
| 3806308 | 9/1989 | Germany . |
| 4025715 | 8/1990 | Germany . |
| 88/00527 | 4/1989 | WIPO . |

OTHER PUBLICATIONS

E. D. Macklen, "Thermistors", Electrochemical Publications Limited, 1979, Introduction, pp. 1–15, Chapter 8, High Temperature and Other Unusual Forms of NTC Thermistor, pp. 139–146.

*Primary Examiner*—Marvin M. Lateef
*Attorney, Agent, or Firm*—Spencer, Frank & Schneider

[57] ABSTRACT

A positive temperature coefficient temperature sensor for use in exhaust-gas systems of internal-combustion engines includes a sensor element having a multilayer laminate composite structure with a positive temperature coefficient thermistor, formed by at least two resistor tracks arranged one above another and electrically insulated from one another. One of the layers of the multilayer structure is an insulating ceramic base film, and a first one of the at least two resistor tracks, with a supply lead, is printed onto the insulating ceramic base film. A second one of the at least two resistor tracks is disposed separately on the insulating ceramic base film by means of at least one insulating layer printed above the first one of the at least two resistor tracks. The at least two resistor tracks disposed one above another are connected by a land guided through the at least one insulating layer. A further film is subsequently laminated on the surface of the insulating ceramic base film printed with the at least two resistor tracks. The at least two resistor tracks are hermetically sealed by the laminate composite structure with respect to a gas being measured and environmental air.

10 Claims, 2 Drawing Sheets

TEMPERATURE SENSOR AND METHOD FOR PRODUCING TEMPERATURE SENSOR ELEMENTS

BACKGROUND OF THE INVENTION

1. Field of the Invention

The invention relates to a temperature sensor, particularly a PTC temperature sensor of the generic type and a method for producing a temperature sensor.

2. Background Information

It is generally known for temperature sensors having temperature sensor elements made of temperature-resistant resistance materials having a temperature-dependent resistance value to be used (cf. E. D. Macklen, "Thermistors" Verlag Electrochemical Publications [Electrochemical Publications Press], Ltd., 1979) for measuring relatively high temperatures such as those which prevail in the exhaust gases of internal-combustion engines.

PTC temperature sensors use the continuous resistance change of metals or semiconductors having a positive temperature coefficient when temperatures change. The metals which are preferably used in PTC temperature sensors are platinum and nickel, as well as their alloys, because of their high stability and reproducibility.

It is furthermore known, for example from EP-A 0,188,900 and 0,142,993, and DE-OS 3,017,947 and 3,543,759, for planar exhaust gas sensors to be used in order to determine the lambda value of gas mixtures, which exhaust-gas sensors can be produced in a particularly cost-effective manner using ceramic-film and screen-printing technology.

It is known from DE-PS 3,733,192 for the aging resistance and the response times of PTC temperature sensors to be improved by hermetically encapsulating the PTC temperature sensor elements with respect to the gas being measured and the environmental air.

It is a disadvantage of the known PTC temperature sensor elements that they have a certain area extent and are thus not subjected to the same exhaust-gas temperature at all points.

SUMMARY OF THE INVENTION

The temperature sensor according to the invention, in contrast has the advantage that sufficiently high measurement resistance values can be achieved by means of a stack arrangement, with a small area extent at the same time, and hence a high level of independence from the temperature gradient in the exhaust gas.

Advantageous developments and improvements of the temperature sensor element are possible. It is particularly advantageous to construct the films A and B from a ceramic on an aluminium-oxide base, and all the conductive elements, that is to say resistor tracks 10, 20, 30, supply leads 11, 21, 31, contacts 12, through-plated holes 14, and lands 15, 16 on a platinum/aluminium-oxide cermet paste. It is furthermore advantageous, and contributes to an area extent which is as small as possible, to construct the resistor tracks 10, 20, 30 in a meandering shape. The construction according to the invention and the claimed production method are particularly suitable for highly compact PTC thermistor temperature sensors in the field of application of high temperatures, as occur in the exhaust gases of internal-combustion engines. In addition to PTC temperature sensors, NTC (Negative Temperature Coefficient) temperature sensors can also be produced utilizing the same advantages in the manner according to the invention.

BRIEF DESCRIPTION OF THE DRAWINGS

Two exemplary embodiments of the invention are explained in greater detail in the following description and are shown in the drawing, in which.

DETAILED DESCRIPTION OF THE PREFERRED EMBODIMENTS

Figure 1:
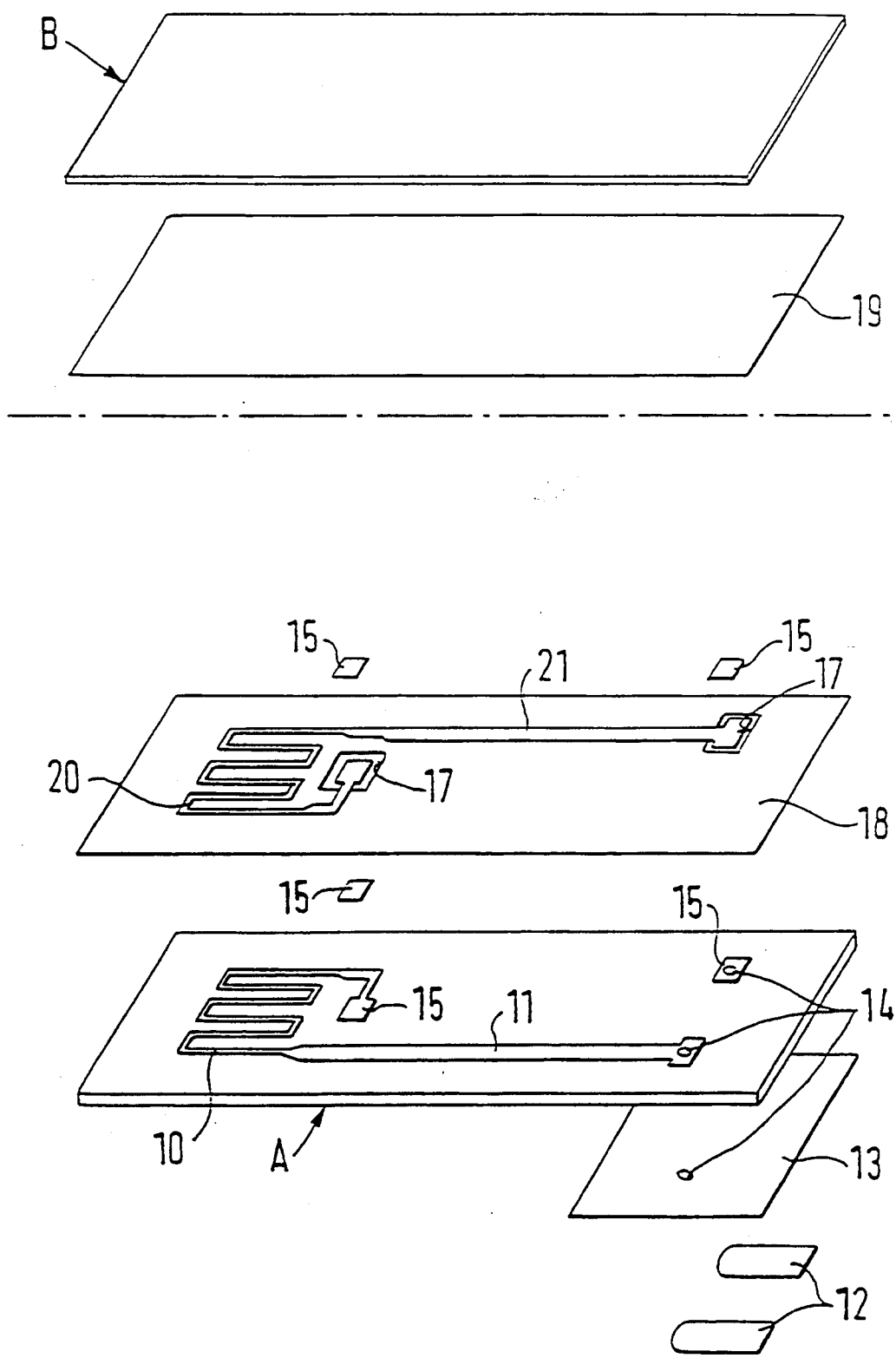
FIG. 1 shows a first exemplary embodiment of a PTC temperature sensor having a double stack arrangement of the resistor tracks.

The method for producing a first embodiment according to the invention of a PTC temperature sensor element consisting of two $Al_2O_3$ ceramic films has been shown schematically in FIG. 1. Two films having a thickness of 0.3 mm in each case were used. Holes 14 for through plating were initially stamped in the film A. A platinum/aluminium-oxide paste was sucked in through the holes in order to introduce the through-plated holes. A resistor track 10 in a meandering shape, a supply lead 11 and lands 15 consisting of platinum/aluminium-oxide/-cermet paste were then printed onto the one large surface of the film A. A bonding agent layer consisting of aluminiumoxide with an increased flux component was then printed onto the opposite large surface of the film A, leaving exposed the through-plated holes of the film A, and platinum/aluminium-oxide contacts 12 were thereafter printed on in the region of the through-plated holes.

An aluminium-oxide insulation layer 18 was subsequently printed onto the large surface of the film A on which the resistor track 10 was printed, leaving windows 17 exposed, and a resistor track 20, a supply lead 21 and, if required, additional lands 15 were printed thereon. A layer 19 consisting of an interlaminar binder on an aluminium-oxide base was then applied, and finally a second aluminium-oxide film B. The stack obtained was laminated together and sintered by heating to a temperature of 1600° C. for approximately 3 hours.

The temperature sensor element obtained was inserted into a housing, not shown, of the type known from DE-OS 3,206,903 and was used for measuring the temperature of exhaust gases of internal-combustion engines.

Figure 2:
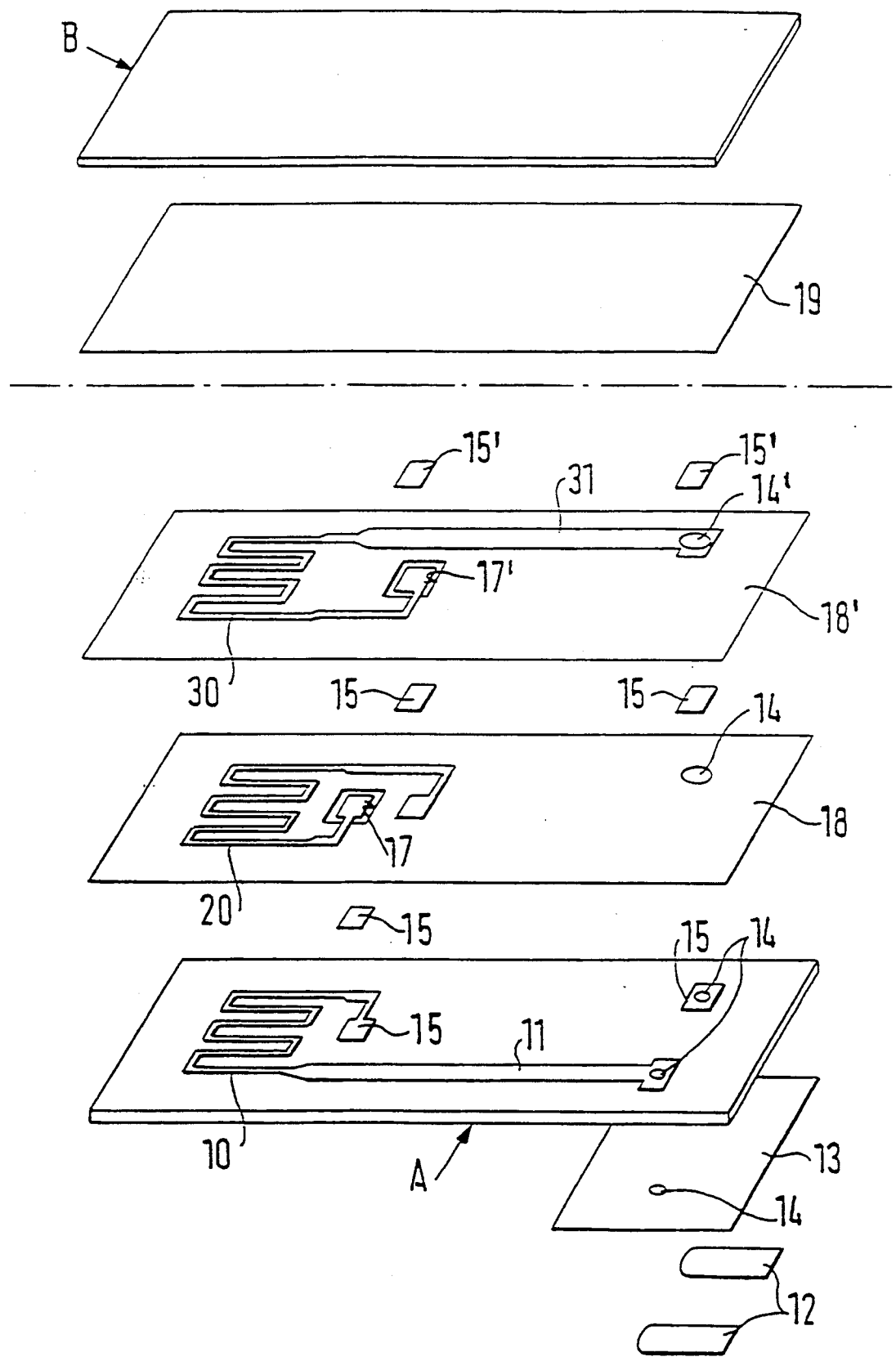
FIG. 2 shows a second exemplary embodiment of the invention having a triple stack arrangement of the resistor tracks.

As is shown schematically in FIG. 2, an insulation layer 18 was initially printed onto the one large surface of the film A, leaving windows 17 exposed, which insulation layer 18 for its part had a resistor track 20 printed on it, in order to produce a further PTC temperature sensor element according to the invention. A second insulation layer 18' was subsequently applied to the first insulation layer 18, likewise leaving windows 17' exposed, and a resistor track 30, a supply lead 31, and additional lands 15' were likewise printed thereon. A triple stack arrangement of the PTC temperature sensor was achieved in this way.

As has been described above for the first embodiment, an interlaminar binder 19 and a second film B were applied, and the stack thus obtained was laminated together and sintered, in order to complete the temperature sensor. The PTC temperature sensor element was inserted into a housing, not shown, of the type known from DE-OS 3,206,903 and was used for measuring the temperature of exhaust gases of internal-combustion engines.

The three-dimensional concentration of the measurement resistor can be further increased by further increasing the number of resistor tracks which are arranged one above the other and have interposed insulation layers. In this case, the arrangement is in principle the same as that described for the second embodiment (triple stack arrangement), with a corresponding increase in the number of insulation layers 18 having printed-on resistor tracks.

The stack arrangement of resistor tracks according to the invention thus makes possible a small area extent and hence both sufficiently high resistance measurement values and a large-scale independence of the same from the temperature gradient in the exhaust gas.

We claim:

1. A positive temperature coefficient temperature sensor for use in exhaust-gas systems of internal-combustion engines, comprising:
    a sensor element having a multilayer laminate composite structure and comprising a positive temperature coefficient thermistor, formed by at least two resistor tracks arranged one above another and electrically insulated from one another;
    wherein said multilayer structure includes an insulating ceramic base film, a first one of said at least two resistor tracks, with a supply lead, being printed onto said insulating ceramic base film;
    wherein a second one of said at least two resistor tracks is disposed separately on said insulating ceramic base film by means of at least one insulating layer printed above said first one of said at least two resistor tracks;
    wherein said at least two resistor tracks disposed one above another are connected to one another by a land guided through said at least one insulating layer;
    wherein a further film is subsequently laminated on the surface of said insulating ceramic base film printed with said at least two resistor tracks; and
    wherein said at least two resistor tracks are hermetically sealed by said laminate composite structure with respect to a gas being measured and environmental air.

2. The temperature sensor according to claim 1, wherein said at least two resistor tracks comprise three resistor tracks which are stacked one above the other and are electrically insulated from one another by respective insulating layers.

3. The temperature sensor according to claim 1, wherein the at least two resistor tracks have a meandering shape.

4. The temperature sensor according to claim 1, wherein the resistor tracks are applied as at least two layers on an insulator-ceramic base, wherein said insulating ceramic base film has said first one of said at least two resistor tracks printed on using thick-film technology with said supply lead, wherein said at least one insulation layer is applied thereto and has printed thereon said second one of said at least two resistor tracks, and wherein said further film is laminated and sintered together with the said insulating ceramic base film.

5. The temperature sensor according to claim 4, wherein the insulating ceramic base film, the further film and the at least one insulation layer are constructed in an $Al_2O_3$ base.

6. The temperature sensor according to claim 1, wherein a last one of the at least one insulation layer is laminated together with the further film by means of an interlaminar binder.

7. The temperature sensor according to claim 1, further comprising a supply lead, contacts, through-plated holes and additional lands;
    wherein said at least two resistor tracks, the supply lead, the contacts, the through-plated holes, the land and the additional lands are formed from a cermet paste.

8. The temperature sensor according to claim 7, wherein the cermet paste is a platinum/aluminium-oxide paste.

9. The temperature sensor according to claim 7, wherein a bonding agent layer comprising aluminium oxide with an increased flux component is applied in the region of the contacts to a surface of the insulating ceramic base film opposite the first one of said at least two resistor tracks.

10. A method of producing a temperature sensor comprising:
    stamping holes for through-plating in a first ceramic film,
    plating the stamped holes producing through-plated holes,
    printing a first resistor track, a supply lead and lands a first surface of the first ceramic film,
    applying an optional bonding agent layer if necessary;
    printing contacts on a second, opposite surface of the first ceramic film,
    subsequently applying at least one insulation layer to the first surface of the first ceramic film on which the first resistor track is printed, leaving windows exposed,
    applying an optional bonding agent if necessary;
    printing a second resistor track on the at least one insulation layer along with a supply lead, and
    subsequently laminating together and sintering with a second film whereby a temperature sensor with a stacked resistor arrangement is produced.

* * * * *